Jan. 14, 1941. V. H. PAVLECKA ET AL 2,228,779
SEALED JOINT
Filed Jan. 3, 1939 2 Sheets-Sheet 1

INVENTORS
Vladimir H. Pavlecka
Kenneth F. Ridley
Allan B. Rogers
BY W. B. Churcher
ATTORNEY Jan. 14, 1941.   V. H. PAVLECKA ET AL   2,228,779
SEALED JOINT
Filed Jan. 3, 1939   2 Sheets-Sheet 2

INVENTORS
Vladimir H. Pavlecka
Kenneth F. Ridley
Allan B. Rogers
BY W.B.Churcher
ATTORNEY Patented Jan. 14, 1941

2,228,779

UNITED STATES PATENT OFFICE 2,228,779

SEALED JOINT

Vladimir H. Pavlecka, Kenneth F. Ridley, and Allan B. Rogers, Santa Monica, Calif., assignors to Douglas Aircraft Company, Incorporated, Santa Monica, Calif.

Application January 3, 1939, Serial No. 249,024

15 Claims. (Cl. 189—36)

Our invention pertains in general to gasket sealed joints in thin sheet metal fabrications with particular reference to fuel tanks, flying boat hulls or floats, aircraft cabins and the like wherein a high strength-weight ratio as well as effectiveness are essential.

The conventional methods in general use for sealing seams having rigid flanges are not favorable for use in sealing seams made on thin sheet metal bodies against fluid leakage. In the rigid flange seams, the squeezing pressure on the sealing gasket is practically uniform, regardless of where the pressure is measured. This uniform flange pressure distribution on the gasket makes possible a leakproof joint, the gasket material usually being determined by factors other than sealing alone, e. g., temperature and the chemical properties of the fluids acting on the joint. On the other hand, thin sheets when joined by a seam always buckle slightly when secured and it has been the practice heretofore, in order to seal these seams satisfactorily, to insert between the overlap of the seam a thick synthetic rubber gasket which, being elastic and applied with a cementitious substance, fills in all irregularities within the seam and is riveted through and held by the seam rivets. Although this method of securing leakproof seams on thin sheet metal bodies is general practice, it suffers from a number of disadvantages among which is lack of cleanliness during assembly due to the use of sticky cements.

Other disadvantages are: the difficulty of obtaining smooth unbuckled sheets at the seams as the securing pressure depresses the rubber gasket inside the seam overlap and produces an uneven surface which is objectionable particularly in aircraft; and the necessity of using long rivet shanks because of the highly elastic and thick gasket material. In such a seam, the rivets are subjected not only to the primary shear load but also to high secondary bending loads which are objectionable from the consideration of leakproofness as well as from the standpoint of structural integrity of the seams.

Besides these mechanical disadvantages, these gaskets suffer also from a deficiency of chemical nature. Some of the synthetic elastics used for sealing purposes are toxic and do not promise complete permanency under the corroding properties of some fluids, for example, modern aircraft fuels.

The principal object of the invention is to increase the sealing dependability of joints and seams in thin sheet metal structures and to provide a seal which does not suffer from the deficiencies already enumerated. Other objects are: to provide a chemically and electrolytically neutral sealing means; to increase the strength-weight ratio of lap-sealed joints; and to produce a seam or joint which will not swell or shrink in contact with fluids and which will be metallically solid thereby preventing loading of the securing rivets in bending.

Solid gaskets made of relatively soft metals are undesirable in the type of joint which involves very thin sheet flanges lacking in rigidity, because of the ability of such gaskets to transmit bending loads from one point of contact with the flange to another. Although all solid metal (lead, tin, copper, Monel) gaskets possess this quality it is not detrimental when used in joints formed with heavy rigid flanges. To seal successfully a seam between thin sheets with a metallic gasket it is necessary that the gasket possess very slight bending rigidity and yet be continuous, the latter quality being defined, in this case, as the ability to transmit shear stress from any one point on the gasket to another. Such a gasket, although metallic, must follow the contours of thin sheets at the seam and adapt itself to any seam irregularities, which is one of the conditions of tight sealing.

The preferred embodiment of our invention provides a joint for a plurality of metal sheets, or for joining structural elements to extruded sections or sheet metal in fluid pressure tight relation, the joint including a gasket comprising a large number of convoluted or individual layers of soft metal, preferably aluminum foil, and an insert within the layers, the faces of the insert having a plurality of perforations, indentations or serrations, the recesses being of such dimensions that the laterally stressed portions of the foil will flow into the voids either by the riveting operation or otherwise securing the parts together in compressed relation. Preferably the metal foil is tissue thin. Riveting or bolting pressures acting on the gasket induce forces and strains emanating radially within the foil from the rivet or bolt shanks. These strains upset the gasket cumulatively into wavy ripples disposed perimetrally around the shanks, and, because of the proximity of the rivets or bolts, these perimetral ripples cross mutually from one shank area to another, thus creating definite troughs caused by the excess amount of foil displaced by the securing strains. This excess foil is then relieved by the recesses in the insert thereby providing a fluid tight gasket.

Another embodiment, and one which is preferred in seams where one sheet or seam member is sufficiently thick, features a longitudinally serrated seam overlap surface on the thick member; or, in lieu of the serrations, this surface can be recessed by spot-facing into it circular depressions. The gasket in such a joint is formed of a plurality of layers of foil without using an insert.

A gasket with an insert is used in joints formed between a plurality of relatively thin sheet metal members. The insert is preferably about .020 inch thick with about forty per cent of its area perforated. The foil material is wrapped around the insert as many as twenty-five times in some instances, giving a total thickness of fifty layers of foil. This gives sufficient thickness for a desirable compressibility, while the independence of the layers obviates rigidity. The insert may be serrated on both sides, if desired, instead of being perforated.

The sealing feature of the gasket, therefore, comprises the intimate association of the foil with the serrations, indentations or perforations, the function of which is to arrange the foil into a pattern of alternately high and low surface contact pressure areas and to provide at the low pressure localities sufficient space to allow the accumulation of excess foil therein, thereby relieving it from haphazard waving caused by riveting or bolting strains. In a joint or seam of this type it is not necessary to apply the foil gasket with either synthetic filling cements or bonding means of any kind.

A sealing gasket of this type has softness and elasticity proportional to the low rigidity of the thin sheet seam flanges. Furthermore, the foil being chemically neutral to gasoline as well as electrolytically neutral to the aluminum alloys commonly used in aircraft construction, the joint is not subject to corrosion in service. Also, this type of seam seal is particularly effective from the considerations of structural rigidity, because the completely metallic sealing gasket makes the joints internally inflexible and does not produce indefinite bending loads in the rivet shanks within the seam thickness. Therefore the seam or joint is capable of withstanding the weaving stresses in aircraft structures as well as commercially feasible under production conditions and reliable in service.

Figures 1, 3:
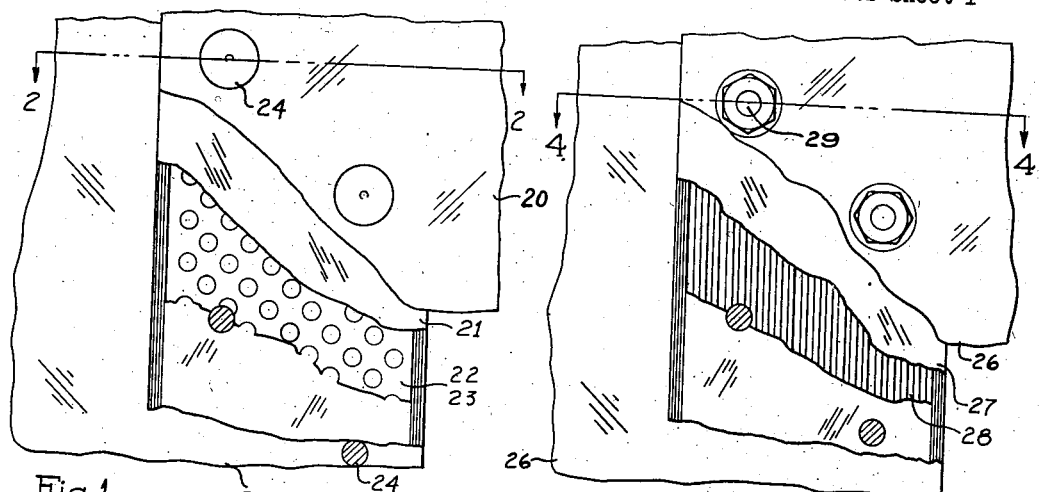
Figure 1 is a fragmentary plan view of a lapped sheet metal joint showing the convoluted foil gasket including a recessed insert.
Figure 3 is a fragmentary plan view of a joint showing the convoluted foil gasket including a serrated type of recessed insert.
Figure 2:
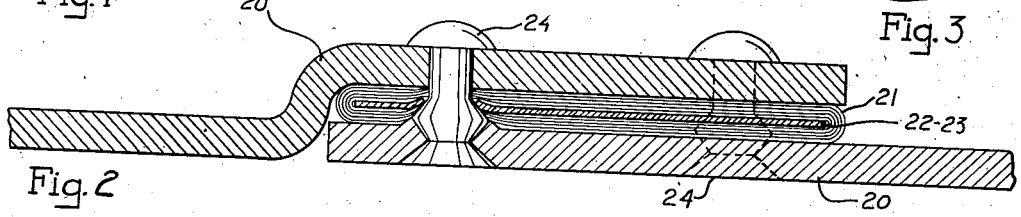
Figure 2 is an enlarged cross section taken on line 2—2 of Figure 1.
Figures 5, 6, 7:
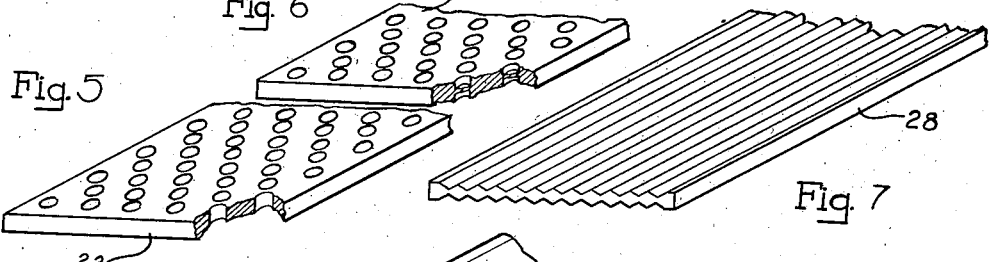
Figure 5 is a fragmentary isometric view of the perforated type of recessed insert shown in Figure 1.
Figure 6 is a fragmentary isometric view of the indented type of recessed insert shown in Figure 1.
Figure 7 is an isometric view of the serrated type of recessed insert shown in Figure 3.

One embodiment of the invention comprises a plain lap joint substantially as shown in Figures 1–2 which includes overlapping sheet members 20 and a foil gasket 21 wherein the foil is built up around a perforated or indented strip of recessed insert 22—23 as depicted by Figures 5 and 6 respectively, and compressed between the overlapping portions of sheet members 20 and secured together as by rivets 24. The securing operation displaces portions of the foil into the voids provided by the recesses thereby relieving the excess amount of foil accumulated by the riveting strains interiorly of the joint. The joint may be formed by arranging the overlapping members and the composite gasket in the relation shown in Figure 2 and then drilling and riveting or bolting the assembly in place. The same method may be employed in forming the joints as shown in the other figures.

Figure 4:
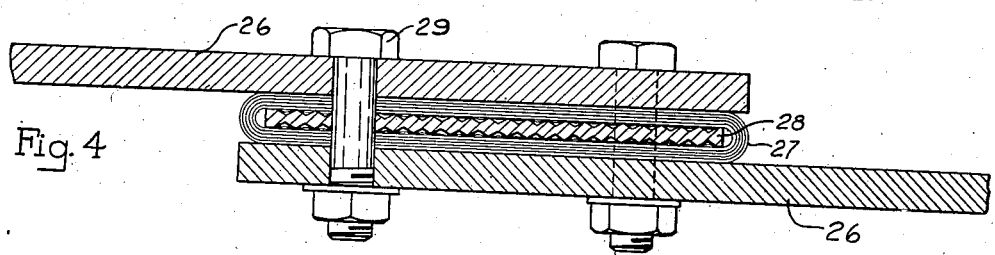
Figure 4 is an enlarged cross section taken on line 4—4 of Figure 3.

A variant of the joint shown in Figures 1–2 is depicted by Figures 3–4 which includes overlapping sheet members 26 and a foil gasket 27 wherein the foil is built up around a serrated strip of recessed insert 28, as depicted by Figure 7, and compressed between the overlapping portions of sheet members 26 by securing bolts 29.

Figure 9:
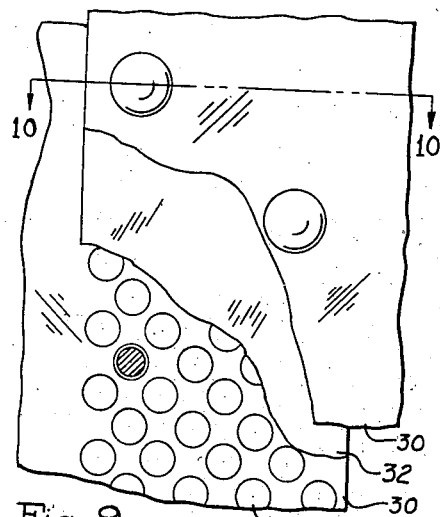
Figure 9 is a fragmentary plan view of a pair of recessed structural elements joined by a convoluted foil gasket.
Figure 10:
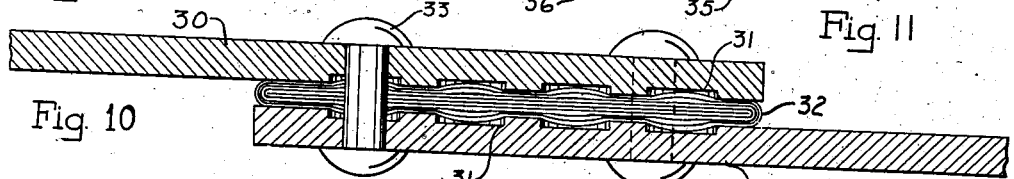
Figure 10 is an enlarged cross section taken on the line 10—10 of Figure 9.

Another embodiment of the invention is shown in Figures 9–10 and comprises structural members 30 having recessed surfaces 31, and a gasket 32 including a plurality of foil convolutions, the gasket being compressed between the members 30 and secured together as by rivets 33 and the recesses providing voids for excess foil. The recesses 31 may be formed in any suitable manner, as by the use of a conventional spot-facing tool. The gasket is fabricated preferably by wrapping the foil around a suitable mandrel 34, which is removed when the gasket is being installed in the joint, or by wrapping the foil around one of the inserts 22—23—28.

Figure 11:
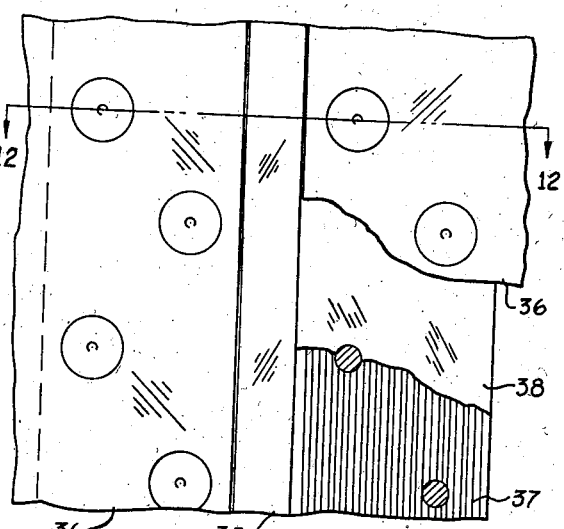
Figure 11 is a fragmentary plan view of a foil gasket joint including a serrated type of recessed structural member.
Figure 12:
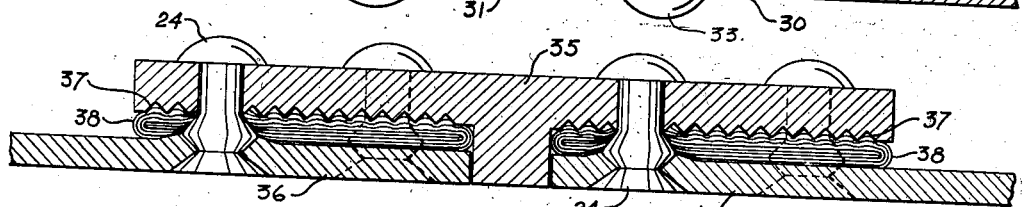
Figure 12 is an enlarged cross section taken on line 12—12 of Figure 11.

A variant of the joint shown in Figures 9–10 is depicted by Figures 11–12 wherein a member 35 joins sheets 36 and 36', surfaces 37 of the member being serrated or indented, and foil gaskets 38 are compressed between the joining member and the overlapping sheets.

Figure 14:
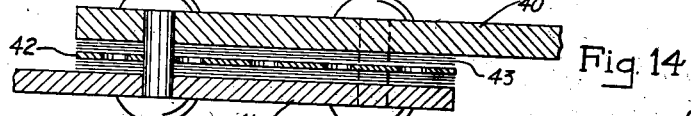
Figure 14 is an enlarged cross section taken on line 14—14 of Figure 13.
Figures 13, 15:
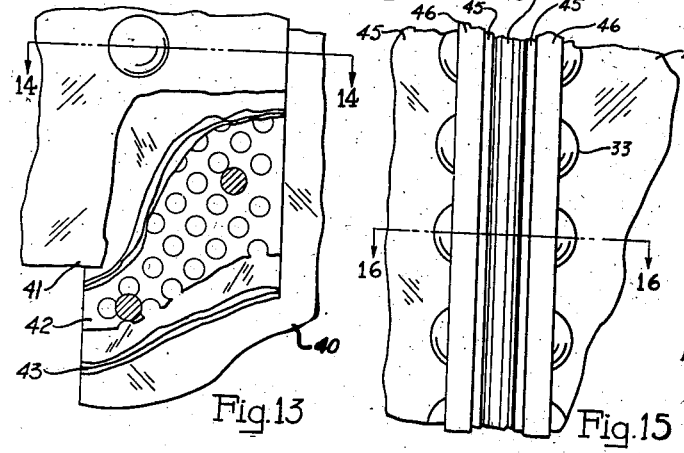
Figure 13 is a fragmentary plan view of a seam showing a foil strip type gasket.
Figure 15 is a fragmentary plan view of a reinforced butt joint including a foil gasket.

Another embodiment of the invention is shown in Figures 13–14 and comprises overlapping members 40—41 including a recessed insert 42 upon each side of which is built up a plurality of individual strips of foil 43. In the fabrication of the joint, the foil strips are compressed between the overlapping members. This embodiment is suitable for installations wherein the exposed edges of the foil are not particularly subject to corrosive influences.

Figure 8:
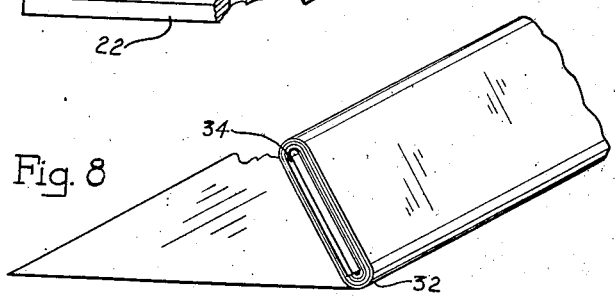
Figure 8 is an isometric view showing the method of fabricating the convoluted foil gasket.
Figure 16:
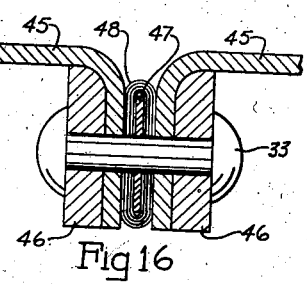
Figure 16 is an enlarged cross section taken on line 16—16 of Figure 15.

An application of the invention to a butt joint substantially as shown in Figures 15–16 comprises sheet members 45; reinforcing strips 46; and a gasket including an insert 47 around which metal foil 48 is either wrapped as shown in Figure 8 or built up as shown in Figure 14 and compressed between the reinforced sheets and secured as by rivets 33.

While we have herein shown and described particular embodiments of our invention and its application to particular types of joints, we wish the invention to be understood as including such embodiments and such applications as fairly come within the scope of the appended claims.

We claim:

1. A fluid tight structural joint including a plurality of overlapping structural seam members of readily bendable material; a gasket comprising layers of metal foil located between each two adjacent overlapping portions of the said seam members; means securing the foil and seam members together in compressed relation; and substantially inelastic means located within the joint for relieving buckling of the gasket foil caused by strains induced therein by the seam compressing means.

2. A fluid tight structural joint including a plurality of overlapping structural seam members of readily bendable material; a gasket comprising convoluted layers of metal foil located between each two adjacent overlapping portions of the said seam members; means securing the foil and seam members together in compressed relation; and a substantially inelastic metallic strip located within the convoluted layers and provided with means for relieving buckling of the gasket foil caused by strains induced therein by the seam compressing means.

3. A fluid tight structural joint including a plurality of overlapping seam members; a gasket comprising convoluted layers of metal foil located between each two adjacent overlapping portions of said sheet members; a perforated insert of substantially inelastic material interposed within the foil convolutions, and means securing the foil, the insert, and the seam members together in compressed relation, whereby the perforations in the insert serve to relieve the excess foil impounded by strains from the seam compressing means.

4. A fluid tight structural joint including a plurality of overlapping seam members; a gasket comprising layers of metal foil located between each two adjacent overlapping portions of said sheet members; a flat perforated metal insert interposed within the foil layers; and means securing the foil, the insert, and the seam members together in compressed relation, whereby the perforations in the insert serve to relieve the excess foil impounded by strains from the seam compressing means.

5. A fluid tight structural joint including a plurality of overlapping structural seam members; a gasket comprising convoluted layers of metal foil located between each two adjacent overlapping portions of said seam members; a serrated insert interposed within the foil convolutions; and means securing the foil, the serrated insert and the seam members together in compressed relation, whereby the serrated troughs of the insert serve to relieve the excess foil impounded by strains from the seam compressing means.

6. A fluid tight structural joint including a plurality of overlapping structural seam members; a gasket comprising layers of metal foil located between each two adjacent overlapping portions of said seam members; a flat recessed insert interposed within the foil layers; the recesses being formed as shallow depressions on each side of the insert; and means securing the foil, the insert and the seam members together in compressed relation, whereby the recesses in the insert serve to relieve the excess foil impounded by strains from the seam compressing means.

7. A fluid tight structural joint including a plurality of overlapping structural seam members; at least one of each two adjacent structural members being serrated longitudinally with the seam; a gasket comprising convoluted layers of metal foil located between each two adjacent overlapping portions of said seam members; and means securing the foil and said members together in compressed relation, whereby the serrated troughs of at least one of said members serve to relieve the excess foil impounded by strains from the seam compressing means.

8. A fluid tight structural joint including a plurality of overlapping structural seam members; at least one of each two adjacent members being provided with shallow spotfaced recesses; a gasket comprising convoluted layers of metal foil located between each two adjacent overlapping portions of said seam members; and means securing the foil and said members together in compressed relation, whereby the recesses of at least one of said structural members serve to relieve the excess foil impounded by strains from the seam compressing means.

9. The method of fabricating a fluid tight structural joint which comprises: wrapping foil around a recessed insert to form a gasket; inserting the gasket between overlapping members; and drilling and riveting the members together in compressed relation, whereby the stresses created in the fabrication of the joint are relieved by the recesses within the gasket.

10. The method of fabricating a fluid tight structural joint which comprises: recessing the inner surface of the overlapping portion of at least one of the joint members; convoluting foil to form a compressible gasket; inserting the gasket between the overlapping members; and drilling and riveting the members together in compressed relation.

11. The method of fabricating a fluid tight structural joint which comprises: recessing the inner surface of the overlapping portion of at least one of the joint members; placing a plurality of individual foil strips in overlying relation to form a gasket; inserting the gasket between the overlapping members; and drilling and securing the members together in compressed relation.

12. A fluid tight gasket including a plurality of layers of metal foil and a recessed insert, the insert being interposed within the foil layers, the recesses being formed as shallow depressions on each side of the insert.

13. A fluid tight gasket including a serrated thin metal strip and a sheet of tissue thin metal foil, the foil sheet being wrapped around the strip a large number of times.

14. A fluid tight gasket including a plurality of convoluted layers of tissue thin metal foil and a perforated insert, the insert being interposed within the foil convolutions.

15. A fluid tight gasket comprising a substantially flat thin strip of relatively inelastic metal, the flat surfaces of said strip being provided with a plurality of recesses, and a sheet of tissue-thin metal foil wrapped around said strip to form a gasket having a plurality of layers of foil on each side of said strip, the wrapping of said foil substantially eliminating exposed edges on the finished gasket.

VLADIMIR H. PAVLECKA.
KENNETH F. RIDLEY.
ALLAN B. ROGERS.